United States Patent [19]
Noguchi et al.

[11] Patent Number: 5,954,459
[45] Date of Patent: Sep. 21, 1999

[54] THROWAWAY INSERTS AND THROWAWAY DRILL

[75] Inventors: Kazuo Noguchi; Masaaki Jindai; Kazuyoshi Kimura; Kazuchika Nasu, all of Itami, Japan

[73] Assignee: Sumitomo Electric Industries, Ltd., Osaka, Japan

[21] Appl. No.: 09/003,820

[22] Filed: Jan. 7, 1998

[30] Foreign Application Priority Data

Jan. 8, 1997 [JP] Japan .................................... 9-001616

[51] Int. Cl.[6] ...................................................... B23B 51/02
[52] U.S. Cl. ............................ 408/59; 407/113; 408/224; 408/713
[58] Field of Search ..................................... 408/223, 224, 408/227, 230, 713, 59, 114, 115; 407/113

[56] References Cited

U.S. PATENT DOCUMENTS

| | | | |
|---|---|---|---|
| 4,297,058 | 10/1981 | Armbrust et al. | 407/113 |
| 4,558,975 | 12/1985 | Hale | 408/713 |
| 4,676,702 | 6/1987 | Reinauer . | |
| 4,859,123 | 8/1989 | Koesashi et al. | 408/713 |
| 4,889,456 | 12/1989 | Killinger | 408/224 |
| 4,930,945 | 6/1990 | Arai et al. | 407/113 |
| 5,269,618 | 12/1993 | Meyer | 408/224 |
| 5,727,910 | 3/1998 | Leeb | 407/113 |

FOREIGN PATENT DOCUMENTS

| | | |
|---|---|---|
| 0 457 488 A1 | 11/1991 | European Pat. Off. . |
| 0 574 376 A1 | 12/1993 | European Pat. Off. . |
| 0 775 547 A1 | 5/1997 | European Pat. Off. . |

*Primary Examiner*—Daniel W. Howell
*Attorney, Agent, or Firm*—McDermott, Will & Emery

[57] ABSTRACT

A throwaway drill capable of machining a workpiece stably in a balanced manner even under high-efficiency, high-load conditions and capable of disposing of chips efficiently and smoothly. The drill carries an outer insert and an inner insert. As shown, each insert has a plurality of cutting edges each having a curved crest, a first slope, and a second slope which is at least partially a curved line. The inner and outer inserts are arranged so that the cutting area to be cut by the outer insert alone is partially cut by a cutting edge portion of the inner insert near its corner, and the cutting area which to be cut by the inner insert alone is partially cut by the crest of one cutting edge of the outer insert.

8 Claims, 12 Drawing Sheets

| Feed rate (mm/rev) | 0.08 | 0.12 | 0.15 |
|---|---|---|---|
| With insert of this invention | | | |
| With prior art insert | | | |

FIG.11A  FIG.11B  FIG.11C  FIG.11D f = 0.15mm/rev    0.18mm/rev    0.2 mm/rev    0.25mm/rev 2.3KW    2.6KW    3KW    3.9KW / 3.3KW Drill : Φ14 × 56 mm (effective length)
Cutting speed V = 120 m/min
Hole depth = 50 mm
Workpiece : S 50 C
Wet cutting

FIG.12

PRIOR ART

THROWAWAY INSERTS AND THROWAWAY DRILL

BACKGROUND OF THE INVENTION

This invention relates to throwaway inserts for rotary cutting tools for machining automotive parts and machine parts, particularly throwaway inserts suitable for drills, and throwaway drills carrying such inserts and improved in cutting balance, hole cutting accuracy and chip disposability.

Figure 12:
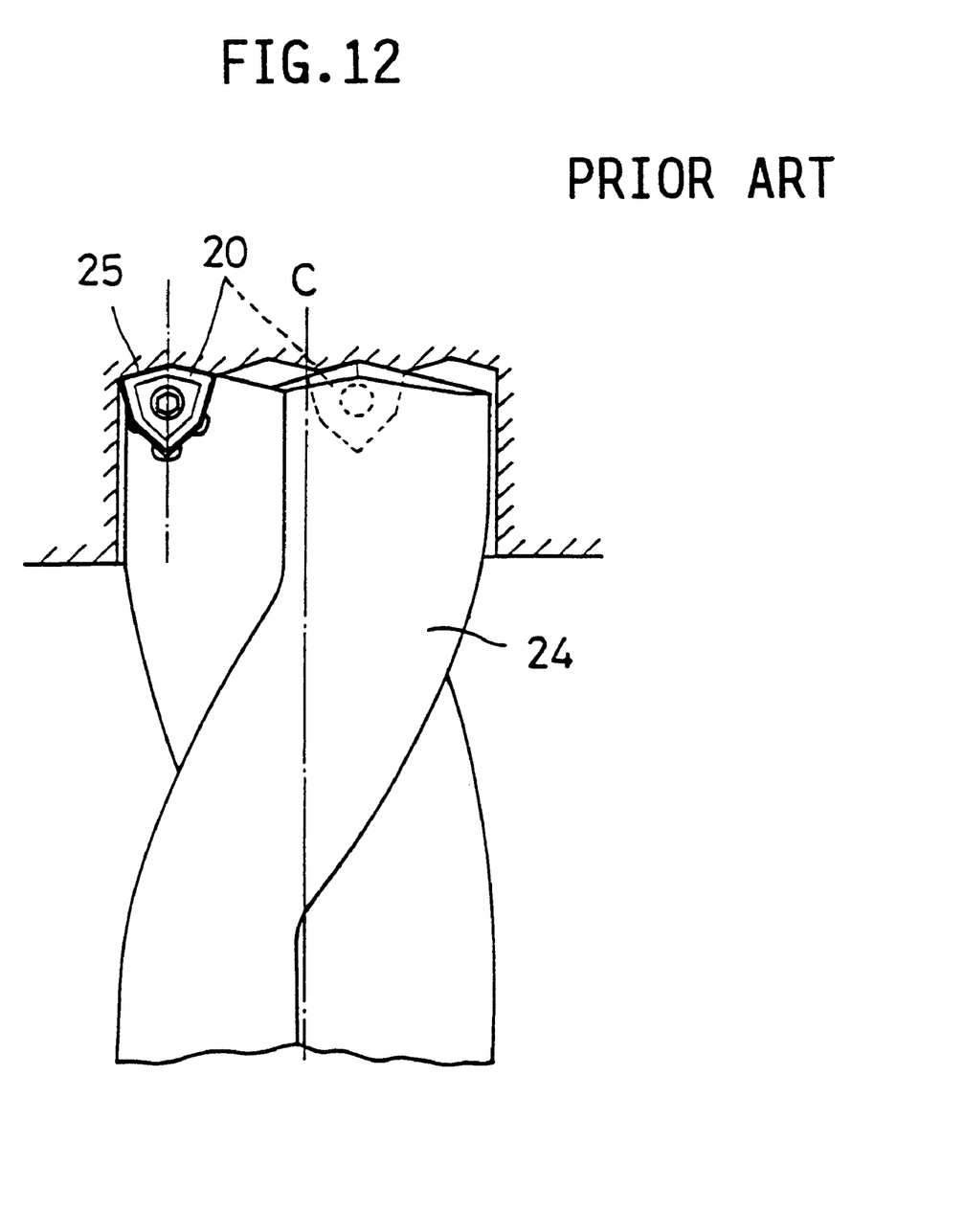
FIG. 12 is a view showing the state of use of a conventional drill.

A throwaway drill disclosed in examined Japanese patent publication 61-21766 carries throwaway inserts and is economical because their plurality of corners can be used for cutting, and is high in cutting balance. Referring to FIG. 12, this drill carries two hexagonal throwaway inserts 20 with alternating acute and obtuse corners. The inserts are arranged diametrically opposite to each other with one of the inserts placed nearer to the rotation axis of the drill than is the other. An angular cutting edges 25 of the insert nearer to the rotation axis is used as an inner cutting edge for cutting the diametrically inner half portion of a workpiece, while an angular cutting edge 25 of the insert remote from the rotation axis is used as an outer cutting edge for cutting the diametrically outer half portion of the workpiece.

Figure 13:
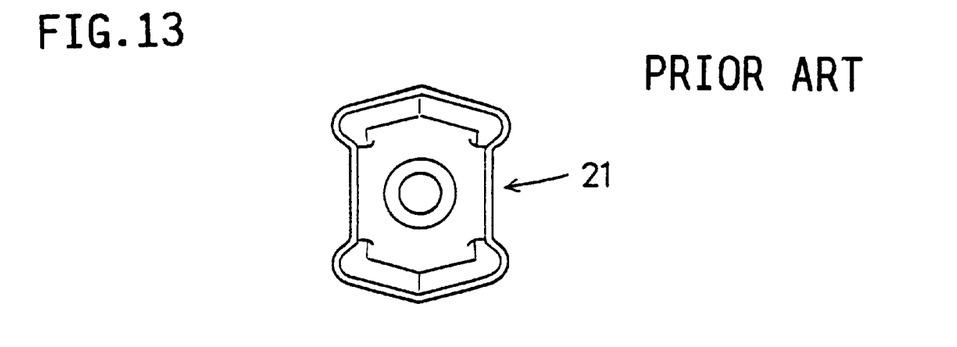
FIG. 13 is a plan view of a different conventional insert to be mounted on a drill.

Another conventional drill uses, instead of the inserts of FIG. 12, inserts 21 as shown in FIG. 13 as its inner and outer cutting edges in the same arrangement for performing the same function as the inserts of FIG. 12.

Figure 14:
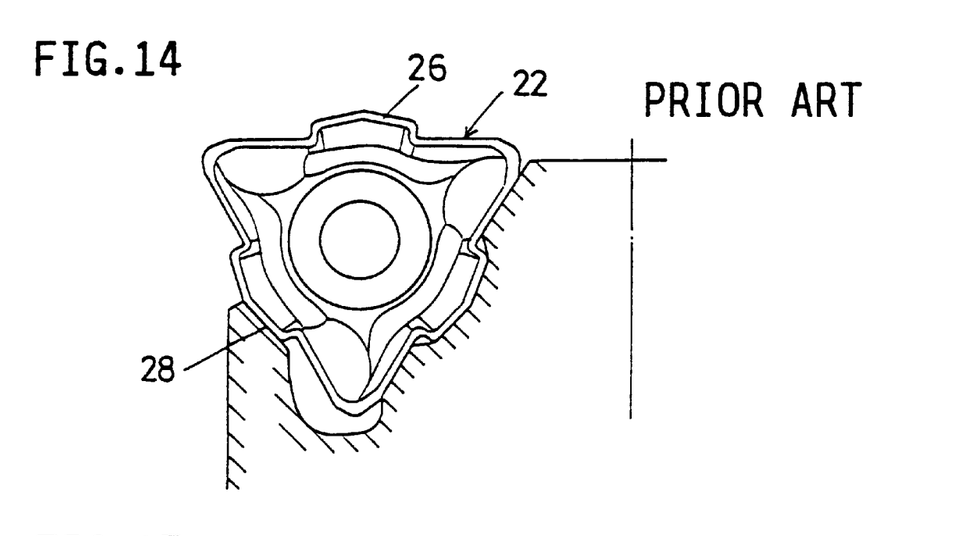
FIG. 14 is a plan view of still another type of conventional insert to be mounted on a drill.

Another conventional drill carries throwaway inserts 22 as shown in FIG. 14 as inner and outer cutting edges. Each insert 22 has a protrusion 26 at the center of each cutting edge adapted to cut into the workpiece before does the cutting edge.

The applicant of the present invention also proposed another type of drill in examined Japanese patent publication 60-1928.

Figure 15:
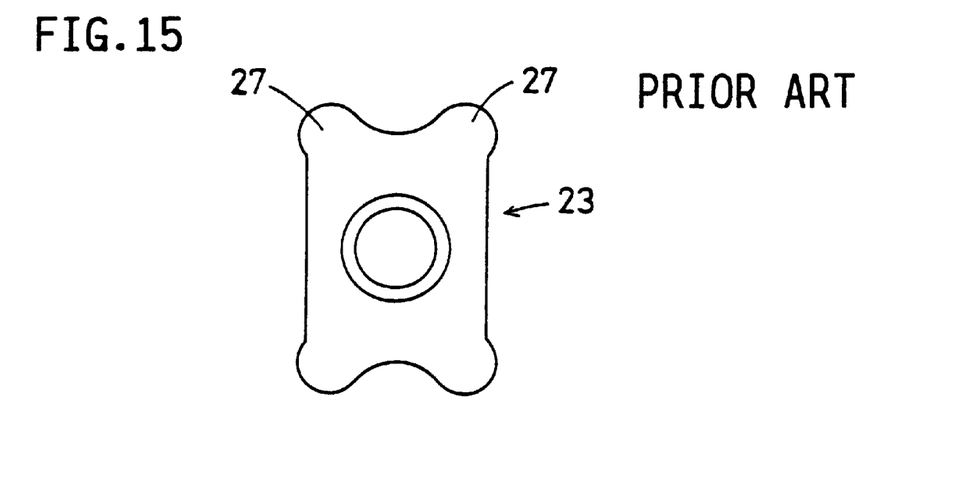
FIG. 15 is a plan view of yet another type of conventional insert to be mounted on a drill.

Still another type of conventional drill utilizes throwaway inserts 23 as shown in FIG. 15 as its inner and outer cutting edges. The insert 23 has substantially a rectangular contour and are formed with convex cutting edges 27 at both ends of the short sides.

The insert shown in FIG. 12 has cutting edges 25 each comprising two slopes intersecting each other at the apex. The two slopes are of the same inclination angle, so that the horizontal component of the cutting resistance that acts on each of the two slopes is cancelled out by the horizontal component that acts on the other slope.

The drill of examined Japanese utility model publication 60-1928 has its inner and outer inserts inclined in opposite ways to each other to cancel out the horizontal components of the cutting resistances that act on the respective inserts. These drills have a problem in that during high-efficiency (high-speed, high-feed) cutting or when a hard workpiece is machined, the cutting resistance tends to be unstable, which leads to ill-balanced cutting, which in turn makes it extremely difficult to form holes with accuracy or increases the possibility of breakage of the inserts and the drill. In particular, if a large load is abruptly applied when the inserts bite a workpiece during high-feed cutting requiring high drill rigidity or while a small-diameter, deep hole is being formed, the cutting balance tends to deteriorate markedly, resulting in breakage of the drill.

Cutting speed is zero at the center of rotation of a drill. The farther from the rotation axis, the greater the cutting speed. This means that the cutting resistance varies with the distance of the cutting edge from the rotation axis. The cutting resistance also varies with the cutting conditions and the kind of workpiece. If a conventional drill having an inner insert used to cut the diametrically inner part of the workpiece and an outer insert used to cut its diametrically outer part, is used for high-efficiency or high-load cutting, it is difficult to maintain good cutting balance due to too large a difference between the cutting forces produced by the inner and outer inserts.

The cutting area is divided into as many sections as the number of inserts used. Thus, even if a plurality of inserts are used, rather wide chips tend to be produced. Therefore, if a difficult-to-break material such as soft steel is machined at high speed or high feed rate, chips are produced in large amounts, increasing the possibility of the drill being clogged with chips. This is another cause of decreased machining accuracy and breakage of the drill.

When a hole is formed in soft steel, large burrs tend to be produced at the hole inlet if the diametrically outer cutting edge angle is large.

With the drill equipped with throwaway inserts as shown in FIG. 14, the protrusion 26 bites a workpiece before does the base portion of the cutting edge to bear the horizontal component of the cutting resistance. But this arrangement still has the problem of a large difference between the cutting forces produced by the inner and outer inserts. This drill also has many other problems including complicated shape of the seats for supporting the inserts 22, low strength of the protrusions 26, and high possibility of breakage of the insert and the drill especially during high-efficiency or high-load machining.

Further, since chips flow out simultaneously from three areas, i.e. the protrusion 26 and the straight portions of the cutting edge on both sides of the protrusion, chips tend to clog the drill by tangling with each other.

The drill having inserts as shown in FIG. 15 can apparently dispose of chips smoothly because one of the convex cutting edges 27 of one insert cuts a portion which the concave portion of the cutting edge of the other insert has passed. But this insert has thin portions between the concave portions (which are between the convex cutting edge portions) and the clamp hole. Thus, the insert is not strong enough as a whole. This means that the insert is likely to break during high-efficiency, high-load machining.

An object of this invention is to provide a high-performance throwaway drill which is free of any of the abovementioned problems.

SUMMARY OF THE INVENTION

According to this invention, improvements are made in the shape of cutting edges of the insert and the arrangement of the inserts on a drill. There is provided a throwaway insert having a clamp hole at its center, a plurality of identically shaped cutting edges, a rake face, and a positive flank that intersects the rake face at an acute angle, the cutting edges being arranged such that when the insert is turned a predetermined angle about the clamp hole, a different one of the cutting edges is brought to a cutting position, characterized in that each of the cutting edges comprises a curved crest, and first and second slopes sloping downward from the crest toward first and second corners of the insert, respectively, the second slope being at least partially a curve and having a smaller inclination angle at its portion nearer to the second corner than its portion nearer to the crest.

The throwaway drill according to the invention comprises a drill body formed with a plurality of insert seats at its tip, half of the insert seats being provided on one of two opposite sides of the drill body with respect to its rotation center and the other half of the inserts being provided on the other side of the drill body, and throwaway inserts as claimed in any of claims 1–5 each clamped on the respective insert seat so that the respective inserts cut different parts of a workpiece, the throwaway inserts being mounted on the drill body with their second corners arranged on the diametrically outside of the drill, and the crest or the second corner of one cutting edge of each insert protruding from a portion of one cutting edge of another insert between the crest and the second corner when the drill is rotated.

Preferably, the crest is provided nearer to the first corner 6b than to the second corner 6a. For increased sharpness in cutting, the second corner 6a may be chamfered.

The throwaway insert should preferably have a chip breaker in the rake face, and/or may have its cutting edges chamfered for increased strength of the cutting edges. The width of chamfering should preferably increase gradually from the second corner toward the first corner.

The drill body is preferably formed with an oil hole through which cutting fluid can be supplied to the inserts.

According to the drill diameter, a pilot drill may be provided at the center of the tip of the drill body so that the drill can be advanced in a straight line. Also, a hard vibration-damping guide may be provided on the outer periphery at the tip of the drill body so as to be in contact with the hole surface to be drilled. Otherwise, two inserts may be mounted on each side of the drill body with respect to the rotation center.

The following description is made on the assumption that the drill carries two inserts, i.e. an inner insert and an outer insert.

The throwaway insert of this invention is a kind of single-apex insert. But unlike conventional single-apex inserts, at least part of the second slope of each cutting edge is a curve, so that the apex angle of each cutting edge can be made small. The insert can thus bite a workpiece without encountering any abrupt large load.

Since the inclination angle of the second slope is smaller at its portion near the second corner than at its portion near the crest, it is possible to reduce the cutting edge angle of the outer cutting edge of the tool and thus to reduce the size of burrs that may be produced when a hole is formed. The insert having chamfered corners can cut a workpiece more sharply, further reducing the size of burrs produced.

The drill according to this invention has its inner and outer inserts arranged so that part of the outer cutting area assigned to the outer insert is cut by the inner insert, and part of the inner cutting area assigned to the inner insert is cut by the outer ring. Thus, the cutting conditions and the material of a workpiece will have little influence on the cutting resistance. This reduces the difference between the horizontal components of the cutting resistances produced by the inner and outer inserts during high-efficiency or high-load cutting. This also reduces disturbance in cutting balance.

Because the crest and the outer corner of one cutting edge of each of the inner and outer inserts work as effective cutting edges, chips are broken into (number of inserts used×2) pieces. Chips are thus made thinner. Since the cutting areas of the inner and outer inserts are arranged alternately with each other in a diametrical direction, chips produced simultaneously at these cutting areas will never tangle with each other. Chips can thus be discharged smoothly without the possibility of clogging.

Since the cutting edges have no large recesses or complicatedly indented portions, the insert is strong enough so that it is less likely to chip even during high-efficiency or high-load cutting.

The provision of chip breakers will further improve the chip disposal efficiency.

By reinforcing the cutting edges so that the width of chamfering of each cutting edge increases gradually from the second to first corner, it is possible to minimize the possibility of chipping of the insert while simultaneously improving the dimensional accuracy of the holes to be formed by the drill. The cutting edge portion nearer to the rotation axis is more likely to weld because it is rotated at a slower speed. Thus, the inner cutting edge portion should be more strong than sharp. On the other hand, the outer cutting edge portion, which is rotated faster, should be more sharp than strong. The insert having its cutting edges chamfered in the abovementioned manner satisfies both of these requirements. Such an insert is less likely to chip and can also form a hole with high accuracy with no burrs produced.

By providing an oil hole in the drill body, it is possible to discharge chips forcibly with cutting fluid supplied through the oil.

Other features and objects of the present invention will become apparent from the following description made with reference to the accompanying drawings, in which:

BRIEF DESCRIPTION OF THE DRAWINGS

FIGS. 11A, 11B, 111C, 11D are graphs showing the measured cutting powers;

DETAILED DESCRIPTION OF THE PREFERRED EMBODIMENT

Figure 1A:
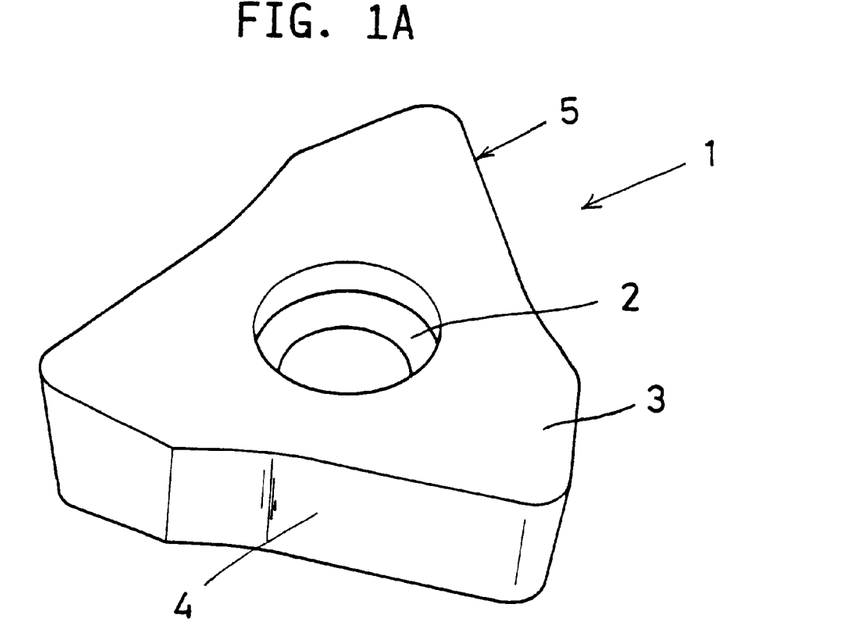
FIG. 1A is a perspective view of a throwaway insert of a first embodiment according to this invention.
Figure 1B:
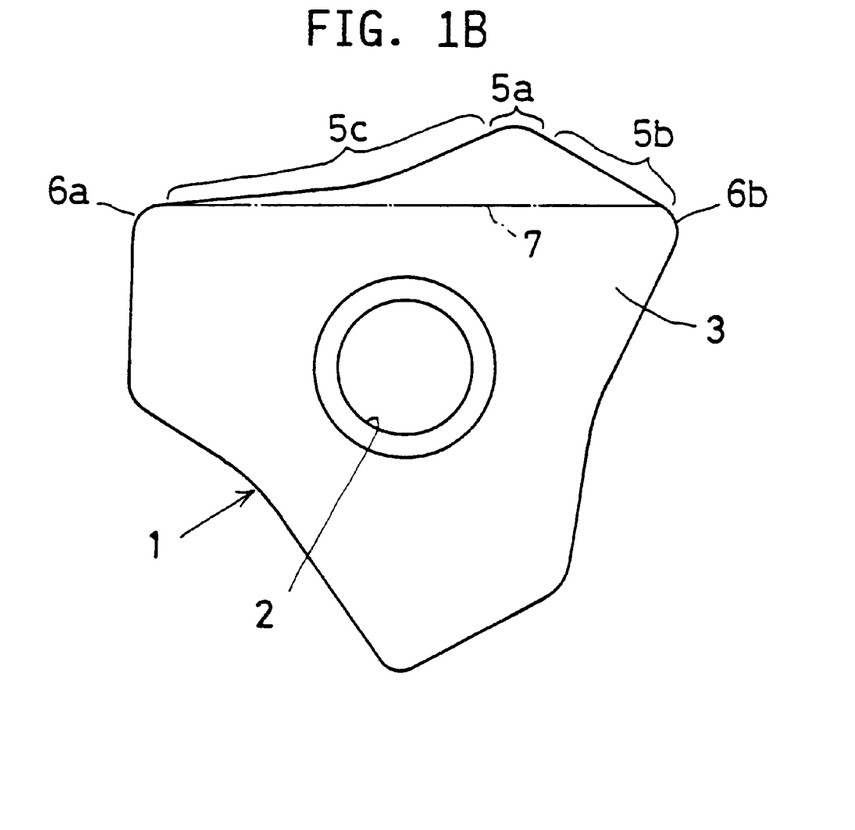
FIG. 1B is a plan view of the throwaway insert of FIG. 1A.

FIG. 1 shows a first embodiment of the throwaway insert according to this invention.

This throwaway insert 1 is substantially triangular in shape with three usable corners, and has a clamp hole 2 in its center. Three identically shaped cutting edges 5 are formed between the adjacent corners along the ridges defined by the rake face 3 and the flank 4. The flank 4 is inclined in a positive direction so that the cutting edges 5 are positive ones.

Each cutting edge 5 comprises a curved crest 5a, a first slope 5b sloping downward from the crest 5a toward a corner 6b, and a second slope 5c sloping downward from the crest 5a toward a corner 6a. The second slope 5c is a partially concave curve having a smaller inclination angle at its portion near the corner 6a than at its portion near the crest 5a.

The term "inclination angle" herein used refers to the angle with respect to the straight line 7 connecting the corners 6a and 6b.

In the embodiment shown, each second slope 5c comprises straight portions and a curved portion. But it may be entirely made up of a curve. The first slopes 5b may be curves. But curved first slopes will reduce the apex angle of the crest 5a, lowering the strength of the insert. Thus, for higher strength of the insert, the first slopes 5b should be straight lines.

To use a different cutting edge of the throwaway insert of FIG. 1 for cutting, the insert is turned 120° about the clamp hole 2.

Figure 2A:
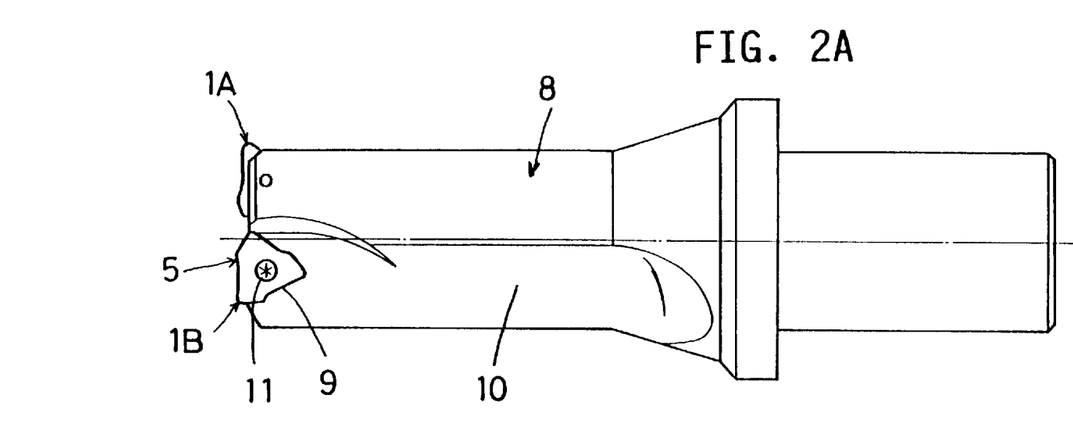
FIG. 2A is a side view of a drill carrying the inserts of FIG. 1.
Figure 2B:
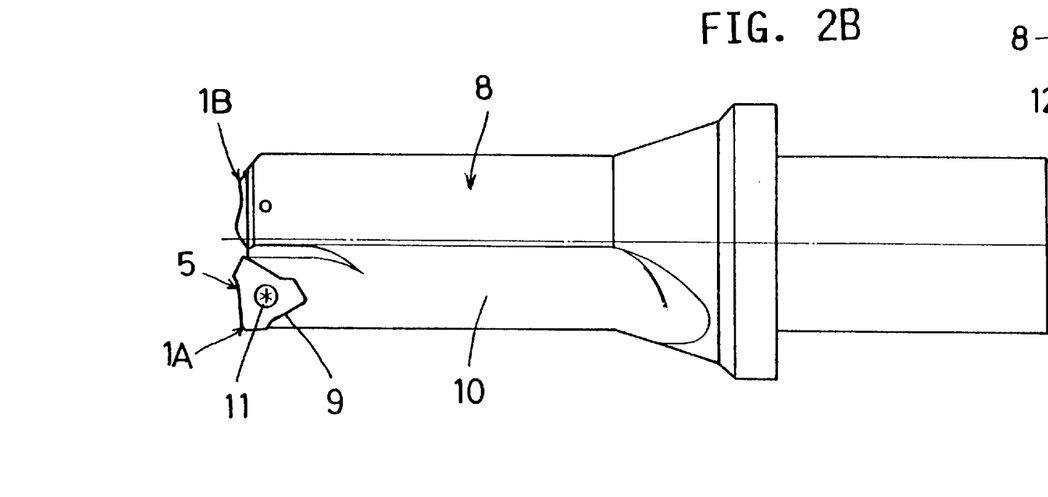
FIG. 2B is a side view of the same drill when half-turned.
Figure 2C:
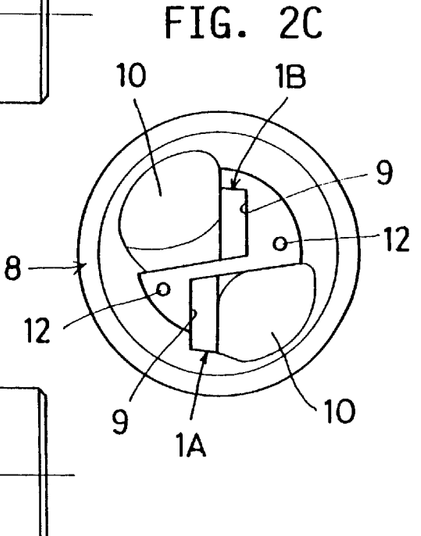
FIG. 2C is its front view in the state of FIG. 2B.

FIGS. 2A–2C show an embodiment of a throwaway drill carrying two of the throwaway inserts of FIG. 1 as an outer insert 1A and an inner insert 1B.

A drill body 8 has at its tip a pair of substantially V-shaped, diametrically oppositely arranged insert seats 9, and on its outer periphery a pair of diametrically oppositely positioned chip discharge grooves 10 extending rearwardly from the respective insert seats 9. The outer and inner inserts 1A, 1B are fixed to the respective insert seats 9 by countersunk headed screws 11.

Figure 3:
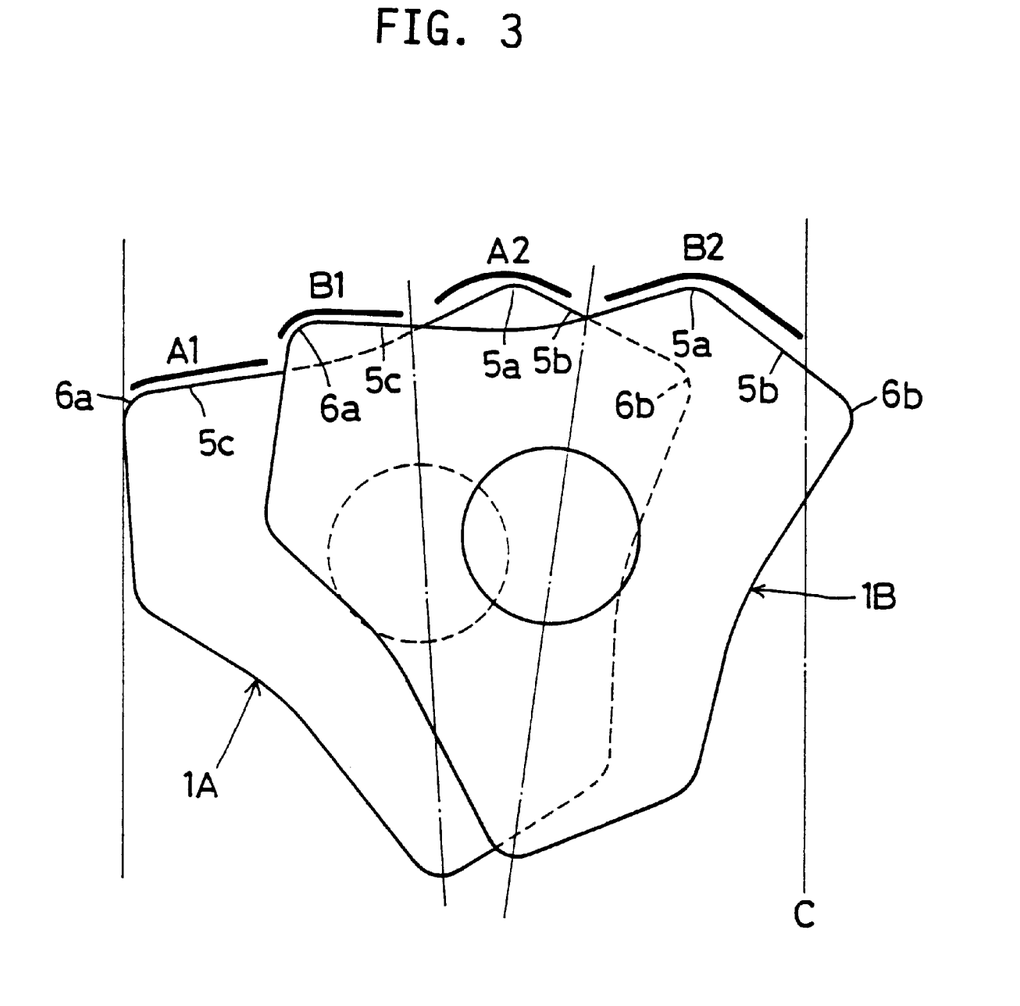
FIG. 3 shows the arrangement of the inserts of the drill of FIG. 2.

As seen in FIG. 3, the outer and inner inserts 1A, 1B are mounted on the drill body with their corners 6a on the radially outside and corners 6b on the inside, their crests 5a substantially on a line extending perpendicularly to the axis (center of rotation) C of the drill, the edge portion around the crest 5a of the outer insert 1A protruding from the portion of the edge of the inner insert 1B between its crest 5a and corner 6a, and the edge portion around the corner 6a of the inner insert 1B protruding from the portion of the edge of the outer insert 1A between its crest 5a and corner 6a. Also, the inner and outer inserts are inclined both relative to each other and relative to the axis C.

Numeral 12 (FIG. 2C) is an oil hole formed in the drill body so as to open to the tip of the body. Cutting fluid is supplied through the hole 12.

With this arrangement, as will be apparent from FIG. 3, the cutting area is divided into four sections A1, B1, A2 and B2, so that chips produced are thinner and can be discharged smoothly. Further, the horizontal components of the cutting resistances that act on the portions of the cutting edge of each insert on both sides of the crest 5a cancel out each other. Also, because the outer insert 1A cuts, besides area A1, area A2 between areas B1 and B2, and the inner insert 1B cuts, besides area B2, area B1 between areas A1 and A2, the difference between the horizontal components of the cutting resistances that act on the cutting edges of both inserts decreases. This insures cutting with good balance even during high-efficiency, high-load machining.

Also, with this arrangement, the edges bite a workpiece not at once but gradually from the crests 5a of the outer and inner inserts. Cutting balance is thus kept high even during high-efficiency, high-load machining.

Since the outermost cutting edge angle is small, burrs produced when a hole is formed are small.

Figure 4:
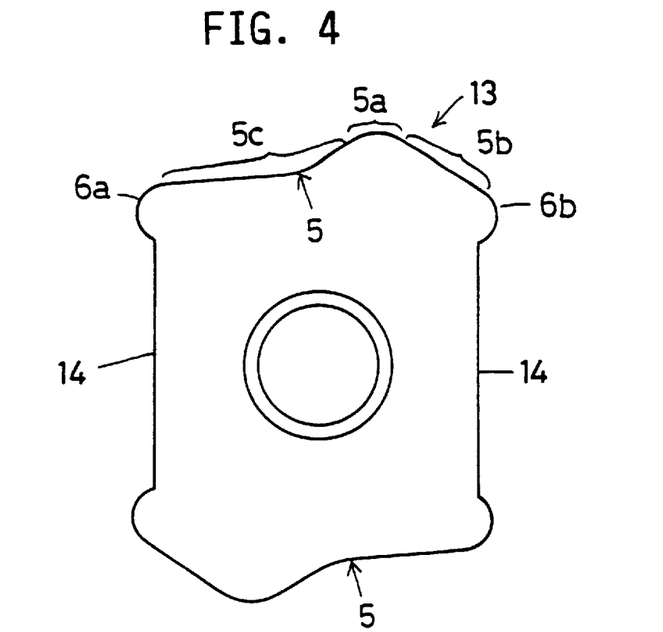
FIG. 4 is a plan view of a throwaway insert of a second embodiment.

FIG. 4 is a throwaway insert of the second embodiment. This throwaway insert 13 has a substantially rectangular shape with two opposite edges forming cutting edges 5 having substantially the same shape as the cutting edges of the insert of FIG. 1. Thus, like elements are indicated by like numerals and their detailed description is omitted. The difference from the insert of FIG. 1 lies in that the two cutting edges 5 are alternately used for cutting by turning the insert 180° and the other two sides 14 are not used for cutting. The sides 14 serve solely as retaining faces for supporting the insert on a seat.

Figure 5:
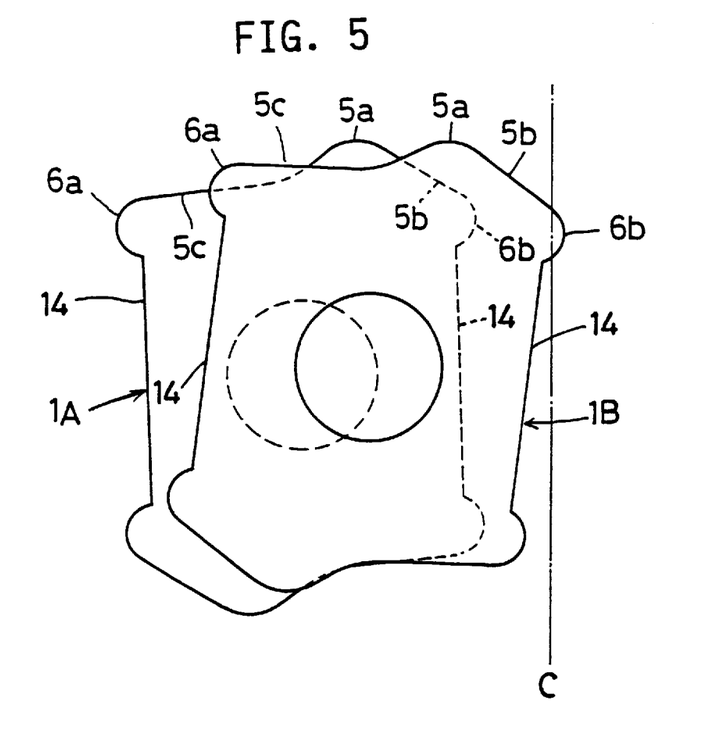
FIG. 5 shows how the inserts of FIG. 4 are mounted on a drill.

FIG. 5 shows two of the throwaway inserts shown in FIG. 4 as mounted on a drill as outer and inner inserts 1A, 1B. The drill carrying these inserts differs from the drill shown in FIGS. 2, 3 only in the shapes of the inserts and insert seats. Thus, its entire view is not shown here.

Figure 6A:
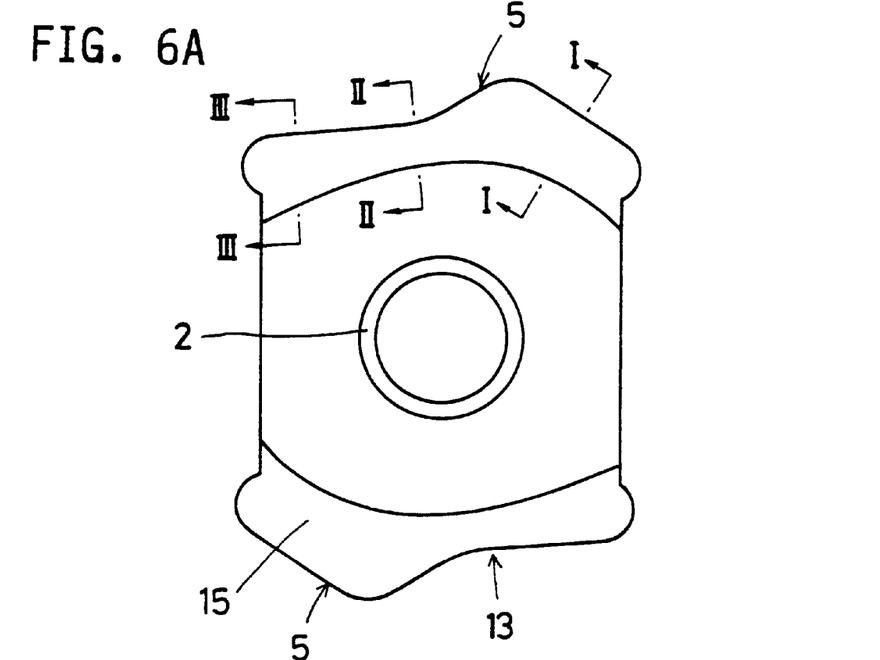
FIG. 6A is a plan view of the insert of FIG. 4 to which are added chip breakers.
Figure 6B:
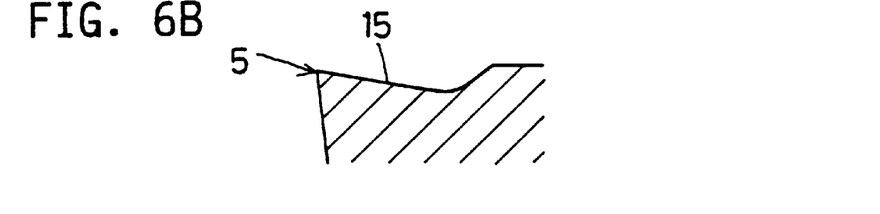
FIG. 6B is an enlarged sectional view taken along line I—I of FIG. 6A.
Figure 6C:
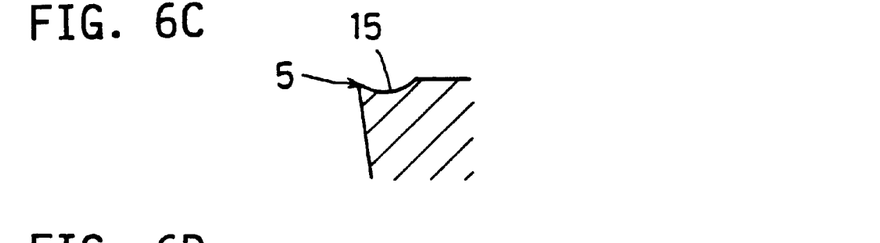
FIG. 6C is an enlarged sectional view taken along line II—II of FIG. 6A.
Figure 6D:
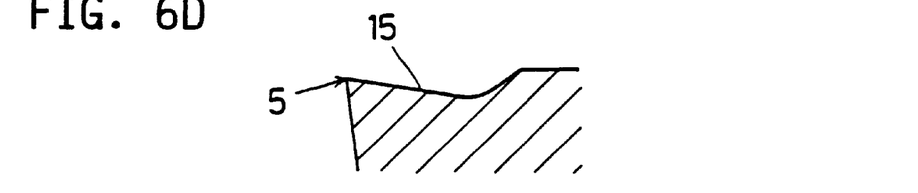
FIG. 6D is an enlarged sectional view taken along line III—III of FIG. 6A.
Figure 7A:
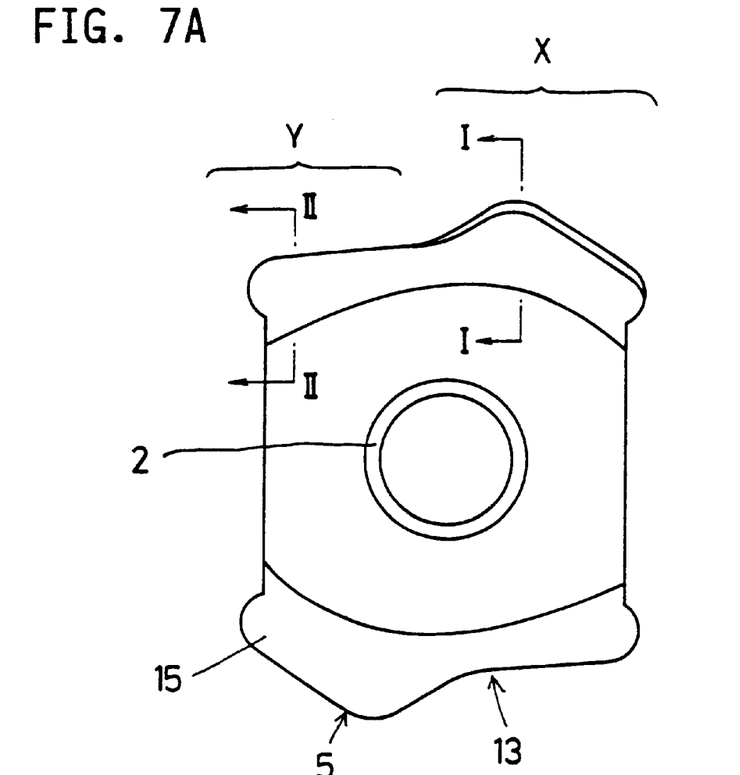
FIG. 7A is a plan view of an edge-strengthened throwaway insert.
Figure 7B:
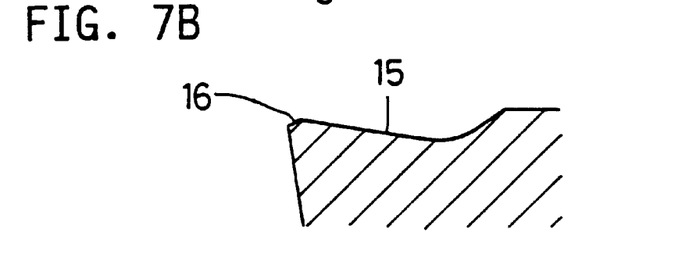
FIG. 7B is an enlarged sectional view taken along line I—I of FIG. 7A.
Figure 7C:
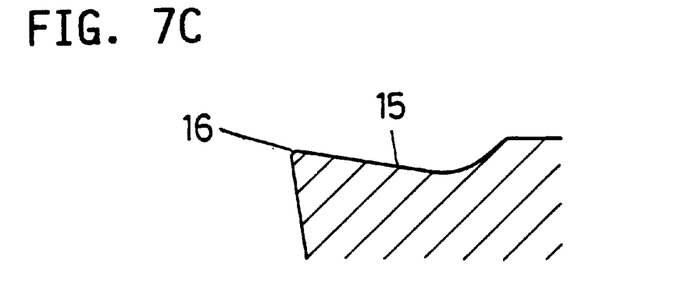
FIG. 7C is an enlarged sectional view taken along line II of FIG. 7A.

FIG. 6A shows the throwaway insert 13 of FIG. 4 to which are added chip breakers 15. Being a groove type, the illustrated chip breakers shown in FIGS. 6B–6D reduce the cutting edge angle and thus improve cutting sharpness. The cutting edges of the insert of FIG. 6A may be chamfered for increased strength as shown in FIGS. 7A–7C. The sharper the cutting edge angle, the more the edge is likely to chip at its portion nearer to the rotation center where the cutting speed is slower.

Thus, in the embodiment of FIGS. 7A–7C, each cutting edge is chamfered more markedly at its portion X, i.e. the portion nearer to the rotation center as shown in FIG. 7B, and is chamfered, as shown in FIG. 7C, to a lesser degree for sharpness in cutting at its portion Y, which is remote from the rotation axis and thus is required to be sharp rather than strong.

Also, in this embodiment, the two edges 5 are treated to different degrees. That is, the top edge in the figure is treated to a higher degree than the bottom edge. The top edge is used as an inner insert, while the bottom edge is used as an outer insert. Thus, it is possible to balance the numbers of inner and outer inserts without increasing the kinds of inserts.

EXAMPLE 1

A drill according to the present invention having the shape of FIG. 2 and carrying the inserts of FIG. 1 was prepared and the horizontal component of cutting resistance was measured, as compared with the conventional drill shown in FIG. 12.

The drill of the invention and the comparative drill both had a diameter of 26 mm.

Figure 8:
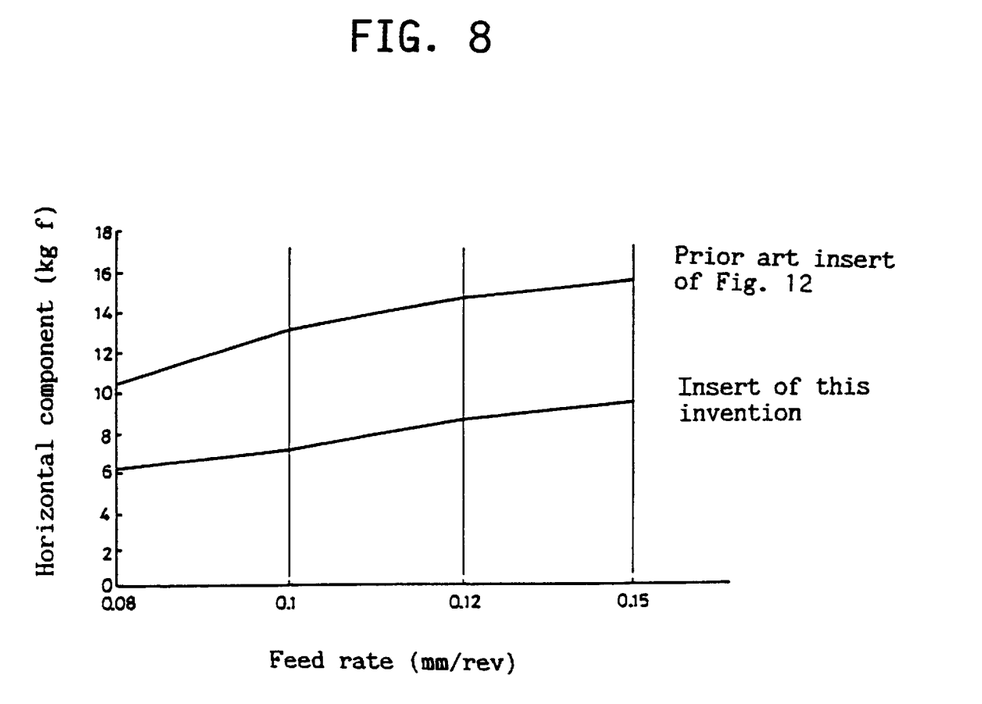
FIG. 8 is a graph that compares horizontal components of cutting resistances.

Using the drill of the invention and the comparative drill, holes 26 mm diameter were formed in an S50C workpiece at a cutting speed V=150 m/min. The relationship between the feed rate and the horizontal component during cutting is shown in FIG. 8. As will be apparent from FIG. 8, the drill of the invention is still lower in the horizontal component of the cutting resistance than the drill of FIG. 12, which is known to have a good balance of cutting. The drill of the invention is thus high in machining stability.

EXAMPLE 2

Chips produced by the drill having the edge shape shown in FIG. 4 (drill of the invention) were compared with chips produced by the drill having the edge shape shown in FIG. 12 (conventional drill) when a workpiece S50C was drilled at the cutting speed V=120 m/min. with different feed rates of 0.08 mm/rev, 0.12 mm/rev and 0.15 mm/rev. Drill diameters were both 14 mm. Chips produced were photographed, and the chips in the photo were traced to outline the chips as shown in FIG. 9.

As shown, chips produced by the drill according to this invention were larger in number and finer than the chips produced by the conventional drill.

Figure 9:
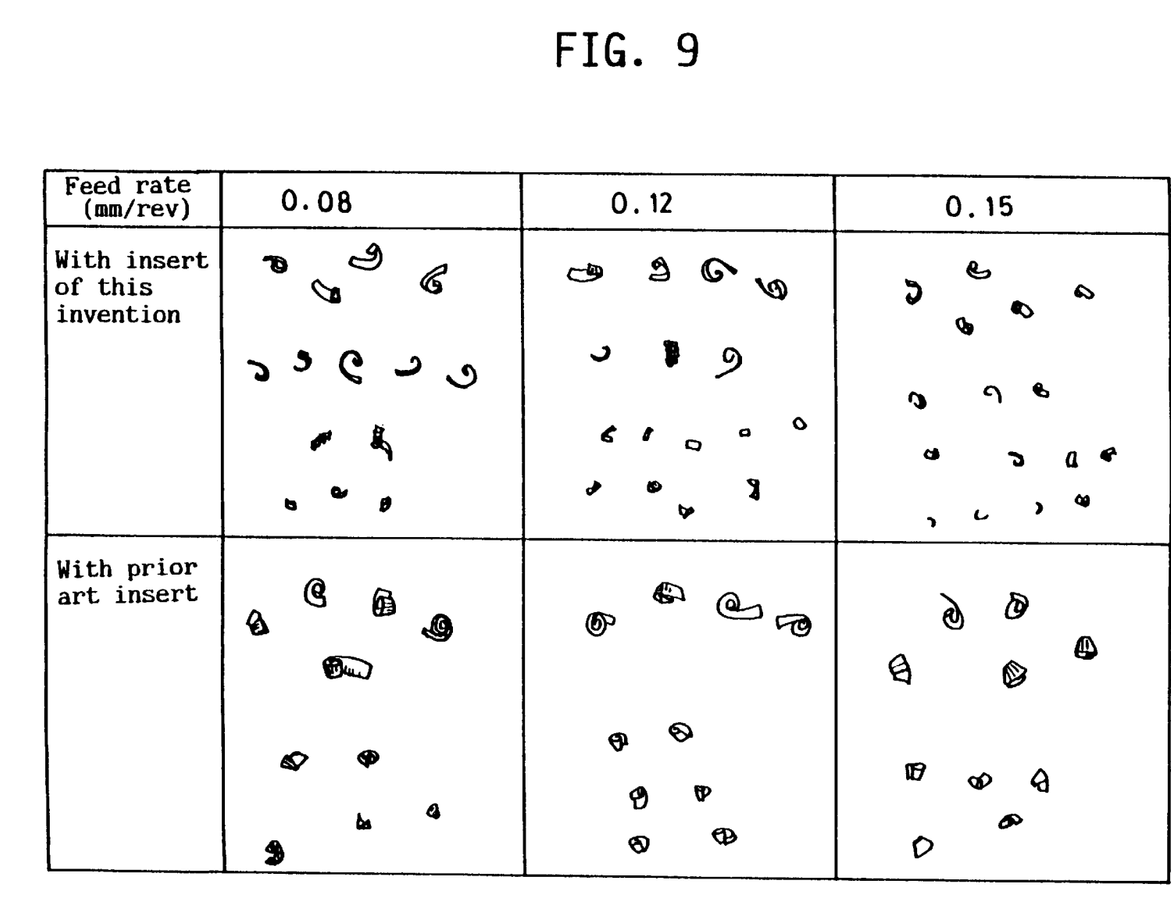
FIG. 9 is a view showing chip shapes.
Figure 10A:
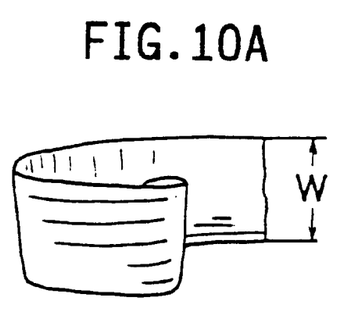
FIG. 10A is an enlarged view of the widest one of the chips produced by the drill of this invention.
Figure 10B:
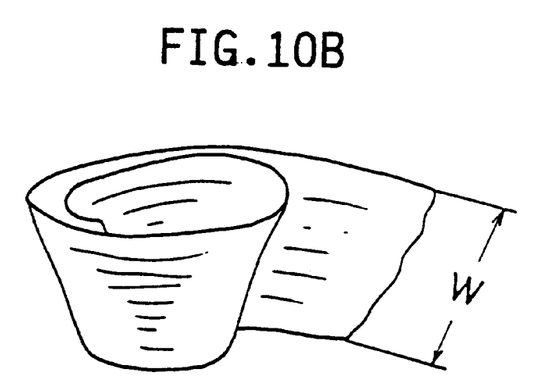
FIG. 10B is an enlarged view of the widest chip produced by a conventional drill.
Figure 11A:
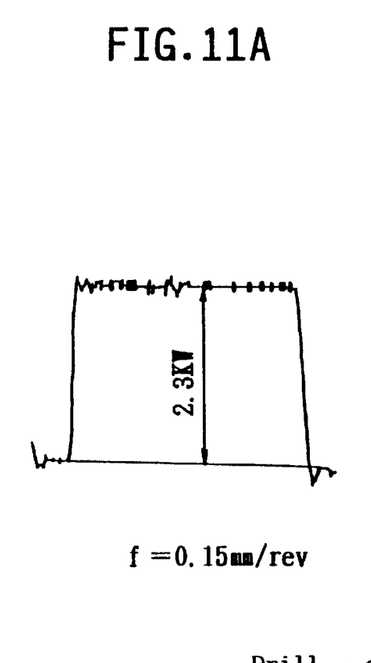
Figure 11B:
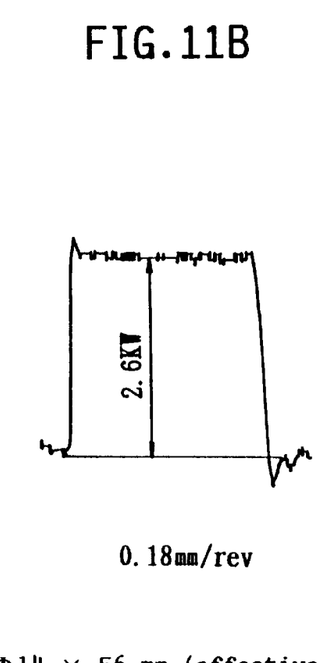
Figure 11C:
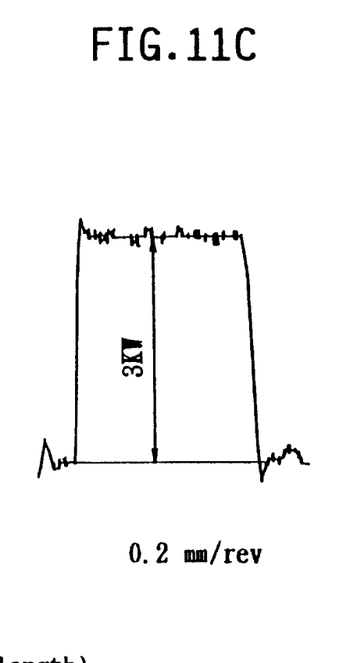
Figure 11D:
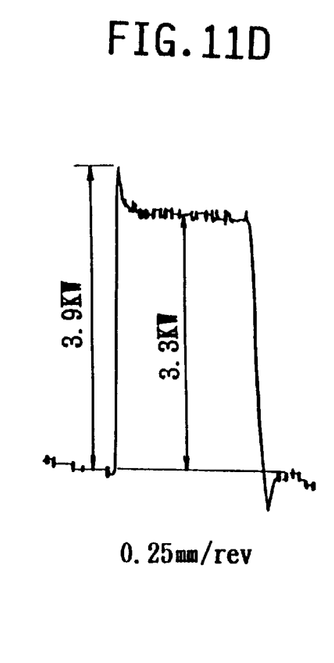

Among the chips shown in FIG. 9, the widest one of the chips produced by the drill of the invention and the widest one of the chips produced by the conventional drill when the feed rate was 0.12 mm/rev are shown in FIGS. 10A and 10B, respectively. The chip in FIG. 10A was 2.0 mm wide, while the chip in FIG. 10B was 4.3 mm. It is thus apparent that the chips produced by the drill of the invention are disposable more easily than the chips produced by the conventional drill.

FIG. 11 shows how the cutting power changed when the feed rate was increased up to 0.25 mm/rev in Example 2. This figure clearly shows that the drill of the invention is usable with good stability up to the feed rate of 0.25 mm/rev, which was impossible with conventional small-diameter drills.

According to this invention, the throwaway inserts mounted on the drill are shaped and positioned so that the horizontal component of the cutting resistance of the drill is smaller than that of conventional drills. The cutting balance thus improves. Since the cutting edge apex angle can be made small, burrs produced when a hole is formed can be made small.

Besides, since chips produced are smaller and finer, they can be disposed of efficiently. This makes it possible to machine harder material with higher efficiency.

By providing chip breakers and/or an oil hole, the chip disposal efficiency improves still more. By reinforcing the cutting edges so that the width of chamfering of each cutting edge is greater at a portion nearer to the rotation axis, it is possible to minimize the possibility of chipping of the insert at a portion nearer to the rotation axis while simultaneously improving the sharpness of cutting with the outer insert. A hole can thus be formed with accuracy.

The throwaway inserts according to this invention are particularly suited for use as drill inserts, but may be used on rough cutting end mills as well-known surfing inserts.

What is claimed is:

1. A throwaway insert having a clamp hole at its center, a plurality of identically shaped cutting edges, a rake face, and a positive flank that intersects said rake face at an acute angle, said cutting edges being arranged such that when said insert is turned a predetermined angle about said clamp hole, a different one of said cutting edges is brought to a cutting position, characterized in that each of said cutting edges comprises a curved crest, and first and second slopes sloping downward from said crest toward first and second corners of the insert, respectively, said second slope being at least partially a curve and having a smaller inclination angle at its portion nearer to said second corner than its portion nearer to said crest.

2. A throwaway insert as claimed in claim 1 wherein said crest is disposed nearer to said first corner at the side of said first slope than to said second corner.

3. A throwaway insert as claimed in claim 1 wherein said second corner toward which said second slope slopes down is chamfered.

4. A throwaway insert as claimed in claim 1 wherein a chip breaker is formed in said rake face.

5. A throwaway insert as claimed in claim 1 wherein said cutting edges are chamfered for added strength of the edges, the width of chamfering increasing gradually from said second corner toward said first corner.

6. A throwaway drill comprising a drill body formed with a plurality of insert seats at its tip, half of said insert seats being provided on one of two opposite sides of the drill body with respect to its rotation center and the other half of said inserts being provided on the other side of the drill body, and throwaway inserts each clamped on said respective insert seat so that said respective inserts cut different parts of a workpiece, each of said inserts having a clamp hole at its center, a plurality of identically shaped cutting edges, a rake face, and a positive flank that intersects said rake face at an acute angle, said cutting edges being arranged such that when said insert is turned a predetermined angle about said clamp hole, a different one of said cutting edges is brought to a cutting position, each of said cutting edges comprising a curved crest, and first and second slopes sloping downward from said crest toward first and second corners of the insert, respectively, said second slope being at least partially a curve and having a smaller inclination angle at its portion nearer to said second corner than its portion nearer to said crest, said throwaway inserts being mounted on the drill body with their second corners arranged on the diametrically outside of the drill, and said crest or said second corner of one cutting edge of each insert protruding from a portion of one cutting edge of another insert between said crest and said second corner when the drill is rotated.

7. A throwaway drill as claimed in claim 6 wherein each of said throwaway inserts is inclined relative to said rotation axis of said drill.

8. A throwaway drill as claimed in claim 6 wherein an oil hole is formed in said drill body to supply cutting fluid to the cutting edges of the inserts through said oil hole.

* * * * *